(12) United States Patent
Lewis et al.

(10) Patent No.: US 9,426,519 B1
(45) Date of Patent: Aug. 23, 2016

(54) SYNCHRONIZED ADVERTISEMENT PLAYBACK ACROSS NAVIGATION EXPERIENCES AND TRANSITIONAL STATES

(71) Applicant: Google Inc., Mountain View, CA (US)

(72) Inventors: Justin Lewis, Marina del Rey, CA (US);
Kevin Greene, San Francisco, CA (US);
Joseph Daverin, San Gabriel, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/297,332

(22) Filed: Jun. 5, 2014

(51) Int. Cl.
| | | |
|---|---|---|
| *H04N 7/10* | (2006.01) | |
| *H04N 5/445* | (2011.01) | |
| *G06Q 30/00* | (2012.01) | |
| *H04N 21/435* | (2011.01) | |
| *H04N 21/472* | (2011.01) | |
| *H04N 21/2543* | (2011.01) | |
| *G06Q 30/02* | (2012.01) | |

(52) U.S. Cl.
CPC ....... *H04N 21/435* (2013.01); *H04N 21/47217* (2013.01); *G06Q 30/0272* (2013.01); *G06Q 30/0277* (2013.01); *H04N 21/25435* (2013.01)

(58) Field of Classification Search
CPC ............ H04N 21/00; H04N 21/25435; G06Q 30/0272; G06Q 30/0277
See application file for complete search history.

(56) References Cited

U.S. PATENT DOCUMENTS

| | | | | |
|---|---|---|---|---|
| 6,064,380 | A * | 5/2000 | Swenson et al. | 715/273 |
| 2001/0054181 | A1* | 12/2001 | Corvin | 725/42 |
| 2008/0098420 | A1* | 4/2008 | Khivesara | G06Q 30/02 725/32 |
| 2008/0281689 | A1* | 11/2008 | Blinnikka et al. | 705/14 |
| 2010/0175079 | A1* | 7/2010 | Braun et al. | 725/32 |
| 2011/0145856 | A1* | 6/2011 | Agarwal et al. | 725/32 |
| 2013/0132211 | A1 | 5/2013 | Tsai et al. | |

FOREIGN PATENT DOCUMENTS

EP  1252767  8/2010

* cited by examiner

*Primary Examiner* — Nathan Flynn
*Assistant Examiner* — James R Marandi
(74) *Attorney, Agent, or Firm* — Byrne Poh LLP

(57) ABSTRACT

Systems and methods that effectuate synchronized advertisement playback across navigation experiences and transitional states, are provided. In an aspect, a system includes an advertisement component configured to play a pre-roll media advertisement associated with a first media item prior to playing of the first media item, a request component configured to receive a request play a second media item prior to completion of the pre-roll media advertisement, and a streaming component configured to initiate playing of the second media item in response to the request, wherein the advertisement component is configured to continue to play the pre-roll media advertisement prior to playing of the second media item.

20 Claims, 12 Drawing Sheets

SYNCHRONIZED ADVERTISEMENT PLAYBACK ACROSS NAVIGATION EXPERIENCES AND TRANSITIONAL STATES

TECHNICAL FIELD

This application generally relates to systems and methods for synchronizing advertisement playback across navigation experiences and transitional states.

BACKGROUND

The sharing of video content on Internet based platforms has developed into a worldwide phenomenon, supported by dozens of websites and mobile applications. Shared video content provides good opportunities to present advertising material to viewers along with the requested video content. However, some mechanisms for delivering advertising with shared video have been relatively ineffective, while others are perceived by users as being objectionable and distractive.

BRIEF DESCRIPTION OF THE DRAWINGS

Numerous aspects, embodiments, objects and advantages of the disclosed subject matter will be apparent upon consideration of the following detailed description, taken in conjunction with the accompanying drawings, in which like reference characters refer to like parts throughout, and in which.

DETAILED DESCRIPTION

Figure 1:
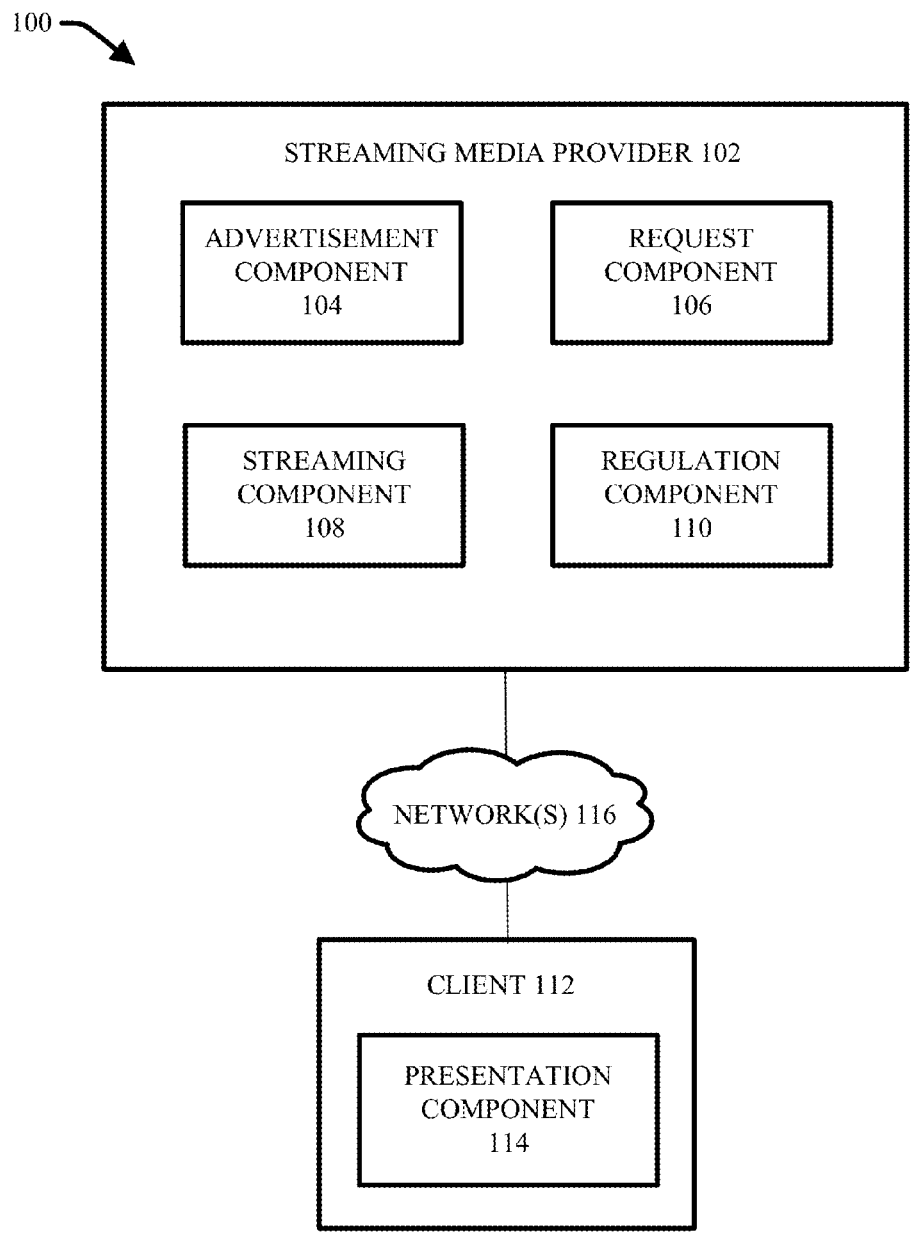
FIG. 1 illustrates an example system for synchronizing advertisement playback across navigation experiences and transitional states in accordance with various aspects and embodiments described herein.

The innovation is described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter described in this disclosure relates to systems and methods for improving the user experience in a network based content consumption environment that uses in-stream advertisements in association with provision of the content so that the user's advertisement consumption and content consumption are less frequently interrupted by navigation mechanics. In particular, mechanisms are provided for enhancing the user experience with respect to consuming mandatory in-stream video and/or audio advertisements associated with a selected media item prior to playing the selected media item. For example, a pre-roll media advertisement includes in-stream video or audio content configured to play at the beginning of a feature media item (e.g., a selected video or audio file). When a user selects or initiates playing of a feature media item, a pre-roll advertisement associated with the feature media will begin playing prior to playing of the feature media. Some pre-roll media advertisements are configured to play to completion prior to allowing the user to view a feature media item while other pre-roll media advertisements are skippable after playing for a pre-determined amount of time. For example, after a skippable pre-roll video advertisement is played for a period of N seconds (e.g., 5 seconds, 10 seconds, 15 seconds, etc.), the user can elect to skip the remainder of the pre-roll video advertisement and move onto the feature video.

In previous media streaming systems that employ pre-roll advertisements, each time a user selects a new media item to consume or opens a selected media item in different media player object or a at different source (e.g., e.g., different networked system, application or device), a new pre-roll advertisement is played. As a result, the freedom associated with selecting and playing new media content is taxed with increased mandatory pre-roll advertisements. In order to alleviate this tax on the user's media consumption experience and provide a more positive user experience with pre-roll advertisements, the subject systems and methods provide for continued playing of a pre-roll advertisement that was playing at a time when a user selected a new media item for playing. The subject systems and methods also provide for continued playing of a pre-roll advertisement across transitions between media players, sources, applications, and devices. The subject systems and methods capitalize on new technologies that enable usage of the same video player object from one video to the next instead of reloading the video player every time the video changes.

In one embodiment, when a user is watching a pre-roll advertisement for a first selected media item and selects a second media item for watching before the pre-roll advertisement is finished, the remainder of the pre-roll advertisement will continue playing before the second media item begins playing. After the remainder of the pre-roll advertisement is finished, the feature video can begin playing as opposed to the playing of a new pre-roll advertisement for the second media item. In an aspect, the pre-roll advertisement is skippable. According to this aspect, the user can dismiss the pre-roll advertisement at a point where it becomes skippable, regardless of the media item it is being played before. For example, a user can watch a pre-roll advertisement associated with a first feature that becomes skippable after 15 seconds. After watching the pre-roll advertisement for 5 seconds, the user can select a new feature video for playing and the pre-roll advertisement will continue to play in a seamless manner (e.g., at the 6 second mark and onward). After 15 seconds have passes from the initial start of the pre-roll advertisement, the pre-roll advertisement can become skippable. In response to user initiated skipping of the advertisement after it becomes skippable, the new feature video can begin playing.

In another embodiment, as a user navigates through a list of potential media items to consume (e.g., watch or listen to) via a graphical user interface (GUI), an advertisement is played in a miniature (mini) player included in the GUI. When the user selects a media item to watch, the advertisement being played in the mini player continues to play (in the mini player or in a new media player) prior to playing of the selected media item. In an aspect, the advertisement will play to completion and then the selected media item can begin. In another aspect, the advertisement can become skippable after a predetermined amount of playing time. According to this aspect, when the advertisement has been played to a skippable point, either before or after the user selects the video to watch, the user can elect to dismiss the advertisement. According to this embodiment, the amount of required watch time associated the advertisement before it becomes skippable can be partially (or fully) fulfilled prior to selection of a video to watch.

In another implementation, a user can initiate watching a media item at a first source or application and switch to watching the media item at a second source or application. When the user initiates watching the media item at the first source, an in-stream advertisement can begin playing (e.g., a pre-roll advertisement). When the user switches over to the second source or application, the in-stream advertisement that began playing at the first source can pick up where it left off at the second source or application. For example, a user can access video hosted by a streaming media provider that is located at a social networking source (or other type of source) in the form of an embedded video. In response to access of the video at the social networking source, the video can begin playing in the embedded player along with a pre-roll advertisement. The user can further select a link associated with the embedded video at the social networking source that results in opening of the video at a network platform of the streaming media provider (e.g., a website platform or mobile application platform). When the video is opened at the streaming media provider platform, rather than starting the pre-roll advertisement over from the beginning or playing a new pre-roll advertisement, the initial pre-roll advertisement can continue playing.

In one or more aspects, a system is provided that includes an advertisement component configured to play a pre-roll media advertisement associated with a first media item prior to playing of the first media item, a request component configured to receive a request play a second media item prior to completion of the pre-roll media advertisement, and a streaming component configured to initiate playing of the second media item in response to the request, wherein the advertisement component is configured to continue to play the pre-roll media advertisement prior to playing of the second media item.

In another aspect, a device is provided that includes an advertisement component configured to play a media advertisement in a media player provided within a graphical user interface generated at the device in response to a determination that the media player is not playing another media item, wherein the graphical user interface is configured to facilitate navigating media content while the media advertisement plays. The device further includes a request component configured to receive a request to play a media item prior to completion of the media advertisement, wherein the advertisement component is configured to continue to play the media advertisement prior to playing of the media item at the device in response to the request.

In yet another aspect, a method is disclosed that includes receiving, by a system comprising a processor, a request to play a media item that initiated playing in a first media player provided at a source remote from the system, wherein a pre-roll-media advertisement associated with the media item was playing in the first media player at the time the request was received. In response to the receiving the request, the method further includes generating, by the system, a second media player for playing of the media item, determining, by the system, a point to which the pre-roll media advertisement was played at the time the request was received, and playing, by the system, the pre-roll media advertisement using the second media player starting at the point prior to playing of the media item using the second media player.

Referring now to the drawings, with reference initially to FIG. 1, presented is diagram of an example system 100 that facilitates synchronizing advertisement playback across navigation experiences and transitional states in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes streaming media provider 102, at least one client device 112 and one or more networks 116 for connecting streaming media provider 102 with the at least one client device 112. Generally, streaming media provider 102 and client device 112 can include memory that stores computer executable components and a processor that executes the computer executable components stored in the memory, examples of which can be found with reference to FIG. 11.

Streaming media provider 102 can included an entity configured to provides to provide streaming media (e.g., video, live video, animations, audio, music etc.) to users at their respective client devices 112 via a network 116. The streaming media can be accessed by the respective users via their respective client devices at a network based platform (e.g., a website, a mobile application) employed by the streaming media provider. For example, streaming media provider 102 can include an Internet based media sharing service configured to allow users to upload and share media content. In another example, streaming media provider 102 can include a social networking system configured to provide streaming media to users in association with other social networking services. In another example, streaming media provider 102 can include an Internet based news source configured to provide streaming media to user in association with news articles and other services. In yet another example, streaming media provider 102 can include an Internet based music streaming service.

In an aspect, streaming media provider 102 has access to a voluminous quantity (and potentially an inexhaustible number) of shared media (e.g., video and/or audio) files for streaming to client devices 112 on demand and/or in a live manner via streaming component 108. The media can be stored in memory associated with the media provider 102 and/or at various servers employed by the media provider and accessed by client devices 112 using a networked platform (e.g., a website platform, a mobile application, etc.) employed by the media provider 102.

The term media content or media item can include but is not limited to streamable media (e.g., video, live video, video advertisements, animations, music, music videos, sound files and etc.) and static media (e.g., pictures, thumbnails). The term media content or media item includes a collection of media items such as a playlist including several videos or songs, or a channel including several videos or songs associated with a single media creator or curator. A channel can include data content available from a common source or data content having a common topic or theme. A channel can be associated with a curator who can perform management actions on the channel. Management actions may include, for example, adding media items to the channel, removing media items from the channel, defining subscription requirements for the channel, defining presentation attributes for channel content, defining access attributes for channel content, etc. The channel content can be digital content uploaded to the internet-based content platform by a channel curator and/or digital content selected by a channel curator from the content available on the Internet-based content platform. A channel curator can be a professional content provider (e.g., a professional content creator, a professional content distributor, a content rental service, a television (TV) service, etc.) or an amateur individual. Channel content can include professional content (e.g., movie clips, TV clips, music videos, educational videos) and/or amateur content (e.g., video blogging, short original videos, etc.). Users, other than the curator of the channel, can subscribe to one or more channels in which they are interested.

Client device 112 can include any suitable computing device associated with a user and configured to interact with streaming media provider 102. For example, client device 112 can include a desktop computer, a laptop computer, a television, an Internet enabled television, a mobile phone, a smartphone, a tablet personal computer (PC), or a personal digital assistant PDA. In an aspect, client device 112 can include presentation component 114 to generate and/or display a graphical user interface (GUI) configured by streaming media provider 102 that facilitates navigating media content provided by the streaming media provider 102 (and/or other content provided by the streaming media provider) and playing streaming media provided by streaming media provider 102. For example, streaming media provider 102 can configure a GUI that includes a video player for playing streaming media content provided by the streaming media provider 102. The GUI can also allow users to search for and navigate potential media items for viewing that are provided by media provider Respective users can view, display and interact with a GUI configured by streaming media provider 102 using presentation component 114 provided on their respective client devices.

In an aspect, presentation component 114 can include an application (e.g., a web browser) for retrieving, presenting and traversing information resources on the World Wide Web. According to this aspect, streaming media provider 102 can provide streaming media to users via a website platform that can be accessed using a browser provided on their respective client devices 112. In another aspect, streaming media provider 102 can provide streaming media to users via a mobile application platform. According to this aspect, streaming media provider 102 can embody a mobile application service provider (ASP) that is accessed by client device 112 using a mobile application client version (not shown) associated with the streaming media provider. Presentation component 114 can employ this mobile application client version of the streaming media provider to access the application platform of the streaming media provider and to generate/display a GUI that facilitates navigating and playing media content provided by the streaming media provider 102.

As used in this disclosure, the terms "content consumer," "user," or "participant" refers to a person, entity, system, or combination thereof that employs system 100 (or additional systems described in this disclosure) using a client device 112. Networks 116 can include wired and wireless networks, including but not limited to, a cellular network, a wide area network (WAD, e.g., the Internet), a local area network (LAN), or a personal area network (PAN). For example, a client device 112 can communicate with streaming media provider 102 and/or another client device (and vice versa) using virtually any desired wired or wireless technology, including, for example, cellular, WAN, wireless fidelity (Wi-Fi), Wi-Max, WLAN, and etc. In an aspect, one or more components of system 100 are configured to interact via disparate networks.

Streaming component 108 is configured to provide streaming media to a client device 112 via a network. In an aspect, streaming component 108 can stream video or audio provided by streaming media provider 102 to client device 112 for playing at the client device 112 (e.g., via presentation component 114) in response to a request for the video or audio. For example, client device 112 can access a network based platform (e.g., a website or mobile application platform) provided by streaming media provider 102 and interact with the streaming media provider 102 via a GUI configured by the streaming media provider 102 and generated/presented by presentation component 114 that facilitates navigating and playing media content provided by streaming media provider 102. A user of client device 112 can identify a media item (e.g., a video, a song, a playlist, etc.) provided by the streaming media provider 102 in a search query, a recommendation list, a catalogue etc. and request to play the media item. Request component 106 can receive such request to play a media item provided by streaming media provider. In response to a received request to play the media item, streaming component 108 can effectuate playing of the media item via a media player included within the GUI by streaming the requested media item to the client device 112 via a network 116.

In another aspect, streaming media provider 102 can automatically initiate streaming and playing of a media item, provided by the streaming media provider 102, devoid of a request provided by a user. For example, streaming media provider 102 can automatically initiate playing of a video or audio file at client device 112 in response to various cues associated with user access and interaction with the streaming media provider 102 via a GUI configured by the streaming media provider 102. For example, streaming media provider 102 can automatically initiate playing of a media item via media player included in the GUI in response to opening of a website or webpage of the streaming media provider 102. In another example, streaming media provider 102 can automatically initiate playing of a media item via a media player included in the GUI as a function of visibility of a media player. According to this example, as the media player becomes visible (e.g., in response to scrolling), streaming component 108 can initiate streaming and playing of the video.

Advertisement component 104 is configured to provide media advertisements in association with streaming media provided by streaming media provider 102. For example, advertisement component 104 can provide in-stream video or audio advertisements that are configured to play before (e.g., pre-roll), during (e.g., mid-roll) or after (e.g., post-roll) a media item. In another example, advertisement component 104 can provide in-video display advertisements in association with streaming videos. In-video display advertisements are configured to be displayed over (e.g., as an overlay) video content (usually at the lower section of the media player) as it plays. They can include still images, animation, video and/or audio. In-video advertisements can be integrated over video content during any point of the playing of the video content. In an aspect, in-video advertisements can be closed by the viewer or will minimize if no user action is taken within a predetermined window of time.

In accordance with an embodiment, advertisement component 104 is particularly configured to tailor provision of pre-roll media advertisements associated with streaming media content provided by streaming media provider 102 to facilitate a continued playback of a pre-roll media advertisement that was playing at a time when a user selects a new media item for playing. In previous media streaming systems, when a user selects a new media item for viewing while a pre-roll advertisement is playing in a media player of a GUI employed by streaming media provider 102, the pre-roll advertisement stops playing and the selected media item is loaded for playing in the media player. For example, the webpage including the video player is refreshed/reloaded with the selected media item and the previously playing pre-roll advertisement is abandoned. Often times, a new pre-roll media advertisement is then played prior to the playing of the selected media item.

In an aspect, advertisement component 104 is configured to play a pre-roll media advertisement associated with a first media item prior to playing of the first media item. For example, advertisement component 104 can play a pre-roll media advertisement before a user requested media item or a media item that was configured to automatically begin playing (e.g., in response to opening or loading of a webpage, based on visibility of a media player, based on inclusion in a media playlist or channel, etc.). Request component 106 is configured to receive a request play a second media item prior to completion of the pre-roll media advertisement associated with the first media item. For example, while the pre-roll media advertisement is playing, a user can navigate through other media items provided by streaming media provider 102 and select a second media item to play. In response to the selection of the second media item, streaming component 108 can initiate streaming/playing of the second media item. However, rather than stopping the pre-roll media advertisement in response to the selection of the second media item, advertisement component 104 can continue playing the pre-roll media advertisement before the second media item begins playing.

For example, advertisement component 104 can continue playing the pre-roll media advertisement in the same media player (or a new/reloaded video player) as the second media item is loaded and buffered for playing in the media player. In an aspect, when the pre-roll media advertisement has completed, streaming component 108 can begin streaming/playing the second media item. In another aspect, the pre-roll media advertisement can be configured for elective dismissal after playing for a minimum duration (e.g., skippable). According to this aspect, streaming component 108 can effectuate playing/streaming of the second media item in response to receipt an election to dismiss the pre-roll media advertisement after the playing for the minimum duration. For example, after the pre-roll media advertisement has played for a total amount of N seconds, including the amount of time the pre-roll advertisement was playing prior to the selection of the new media item, the pre-roll advertisement can become skippable.

In another example, advertisement component 104 can continue to play a skippable pre-roll media advertisement before a new media item that was previously playing at a time when the new media item was selected for playing yet discredit the amount of time the skippable pre-roll media advertisement was playing as counting toward the minimum watch time before the pre-roll advertisement becomes skippable. In other words, advertisement component 104 can continue to play the skippable pre-roll media advertisement yet only consider the amount of time during which the skippable pre-roll media advertisement was played following the selection of the new media item as counting towards the minimum duration of watch time before the skippable pre-roll advertisement can be skipped or dismissed.

In an aspect, a new media item that was selected or requested for playing while a first pre-roll media advertisement was playing can be pre-configured to include a pre-roll media advertisement. According to this aspect, rather than playing another pre-roll media advertisement prior to playing the new media item, advertisement component 104 can skip or override the playing of the other pre-roll advertisement based on receipt of the request to play the new media item prior to completion of the first pre-roll media advertisement. In other words, advertisement component 104 can override or skip the playing of the other pre-roll media advertisement associated with the new media item based on the fact that a first pre-roll advertisement was carried over to the new media item. As a result, when a user transitions from one media item to another media item, buffer time associated with loading a new pre-roll advertisement for playing before the other media item can be eliminated. In addition, buffer time associated with the loading the other media item can occur while the previously playing pre-roll advertisement continues to play.

According to this embodiment, when a user is watching a pre-roll video advertisement for a given video and transitions to a new video before the pre-roll video advertisement is finished, the pre-roll video advertisement continues playing in the video player that will play new video. After the pre-roll video advertisement is complete (or skipped when and/if it becomes skippable) the new video will begin playing. This feature is particularly beneficial to users that create and consume media playlists. Media playlist can include a sequence of video and/or audio files configured to automatically play one after the other. Pre-roll advertisements are often intermixed every so often in between videos or songs included in a media playlist. With the subject features of advertisement component 104, if a user is watching a pre-roll media advertisement for a video or song in a playlist and hits "next" to advance to the next video or song in the playlist before the pre-roll advertisement is finished, advertisement component 104 can continue to play the pre-roll advertisement before the next video or song begins instead of reloading an entirely new pre-roll advertisement and starting it from the beginning.

In another aspect of this embodiment, streaming media provider 102 can configure a GUI that includes a scrollable feed with different media items that a user can scroll through and select for watching. In response to selection of one of the media items, the media item can begin playing in a media player included in the GUI, and prior to streaming/playing the media item, advertisement component 104 can play a pre-roll media advertisement. As the pre-roll media advertisement is playing, the user can navigate back to the scrollable feed and select a new media item to watch. In response to selection of the new media item, streaming component 108 can initiate streaming of the new media item for playing in the media player in which the pre-roll advertisement is playing or a media player. However, rather than restarting the previously playing pre-roll media advertisement or stopping the previously playing pre-roll media advertisement and playing a new pre-roll media advertisement, advertisement component 104 can continue playing/streaming the previously playing pre-roll media advertisement.

In an aspect, advertisement component can 104 partially rewind a pre-roll media advertisement that was playing at the time of selection of another media item prior to continuing to play the pre-roll media advertisement before playing of the other media item. For example, as a user navigates through the feed while a pre-roll video advertisement is playing, it can be assumed that the user is not fully engaged with the pre-roll advertisement. To account for this partial disengagement, advertisement component 104 can partially rewind the pre-roll advertisement from a point at which it was playing at the time of selection of a new media item before continuing to play the pre-roll advertisement before playing of the new media item. The amount of time for which the pre-roll advertisement is rewound can be based on the amount of time during which the user was partially disengaged. In an aspect, where the amount of rewind time exceeds a threshold amount (e.g., 50% or more of the pre-roll advertisement, 75% or more of the pre-roll advertisement, etc.), advertisement component 104 can play a new pre-roll media advertisement before the new media item rather than rewinding and continuing to play the previously playing pre-roll advertisement. For instance advertisement component 104 can continue to play the previously playing pre-roll advertisement following selection of the new media item without rewinding it and then play an additional pre-roll media advertisement. In another example, advertisement component 104 can stop playing the previously playing pre-roll advertisement following selection of the new media item and then play an additional pre-roll media advertisement.

In another example, as a user navigates through the feed while a pre-roll video advertisement is playing the video player in which the pre-roll advertisement is playing may move off the visible area of the GUI. For example, as a user scrolls down the feed, the contents of the GUI, including the video player, can move up and eventually off of the visible area of the GUI. According to this aspect, advertisement component 104 can discredit watch time associated with the pre-roll video advertisement when the video player is not visible. For example, advertisement component 104 can determine a point in the pre-roll video advertisement where it became not visible (or partially visible) based on navigation mechanics associated with user navigation about the GUI including the video player playing the pre-roll video advertisement. Advertisement component 104 can then partially rewind the pre-roll advertisement to that point before continuing to play the pre-roll advertisement following selection of a new media item for playing. In an aspect, where the amount of rewind time exceeds a threshold amount (e.g., 50% or more of the pre-roll advertisement, 75% or more of the pre-roll advertisement, etc.), advertisement component 104 can play a new pre-roll media advertisement before the new media item rather than rewinding and continuing to play the previously playing pre-roll advertisement. For instance advertisement component 104 can continue to play the previously playing pre-roll advertisement following selection of the new media item without rewinding it and then play an additional pre-roll media advertisement. In another example, advertisement component 104 can stop playing the previously playing pre-roll advertisement following selection of the new media item and then play an additional pre-roll media advertisement.

In yet another example, as a user navigates through the feed (or other area of the GUI) while a pre-roll video advertisement is playing, the user may mute or decrease the volume of the pre-roll advertisement. According to this aspect, advertisement component 104 can discredit watch or listen time associated with the pre-roll advertisement when the volume is muted or decreased. For example, advertisement component 104 can determine a point in the pre-roll advertisement where it was muted and then partially rewind the pre-roll advertisement to that point before continuing to play the pre-roll advertisement following selection of a new media item for playing. Also according to this example, where the amount of rewind time exceeds a threshold amount, advertisement component 104 can play a new pre-roll media advertisement before the new media item rather than rewinding and continuing to play the previously playing pre-roll advertisement.

In another aspect of this embodiment, streaming media provider 102 can employ a GUI that includes a plurality of embedded video players included in a scrollable feed separated by other content (e.g., messages, articles, still images, etc.). Each of these videos players can be configured to automatically begin playing a video in response to visibility of the respective video players as a result of user scrolling. For example, as a user scrolls through the feed and a video player becomes visible, a video associated with the video player can begin automatically playing. Prior to playing the respective feature videos associated with the video players, advertisement component 104 can be configured to play a pre-roll media advertisement. According to this aspect, when a first pre-roll media advertisement automatically begins playing in a first video player and a user continues to scroll through the feed to reveal a second video player while the first pre-roll advertisement is playing, rather than stopping the first pre-roll advertisement and starting a second pre-roll advertisement in the second video player, advertisement component 104 can continue playing the first pre-roll advertisement in the second video player.

Regulation component 110 is configured to identify and implement restrictions regarding association of media advertisements with media items. In particular, media items can be associated with various restrictions regarding features of media advertisements allowed for association therewith. These restrictions can related to the type or format of media advertisement (e.g., in-stream pre-roll, in-stream mid-roll, in-stream post-roll, or in video display advertisement), the duration of the media advertisement, whether and when the media advertisement can be skipped, the quality of the media advertisement, and/or the content of the media advertisement. Similarly, media advertisements can be associated with various restrictions regarding features of media items allowed for association therewith, including features related to quality of the media items, content of the media items, and/or an audience type associated with the media items.

In an aspect, regulation component 110 is configured to account for discrepancies associated with features of a media advertisement (e.g., a pre-roll advertisement) that is carried over to a new media item and features of a media advertisement allowed or preferred for association with the new media item. In particular, as previously described, advertisement component 104 can play a first pre-roll media advertisement before a first media item. While the first pre-roll media advertisement is playing, request component 106 can receive a request to play a second media item. In an aspect, in response to the request, advertisement component 104 can continue to play the first pre-roll media advertisement before playing of the second media item as opposed to stopping the playing of the pre-roll media advertisement and playing a second pre-roll media advertisement before the second media item. However, in an aspect, the first media advertisement may not satisfy restrictions for features of advertisements allowed or preferred for association with the second media item.

For example, the second media item may require or prefer an in-video display advertisement or an in-stream post roll media advertisement as opposed to a pre-roll media advertisement. In another example, the second media item may require or prefer a pre-roll media advertisement having a different duration (e.g., longer or shorter) than the first pre-roll advertisement. In another example, the second media item may require or prefer a pre-roll media advertisement that is skippable when the first pre-roll media advertisement is not skippable, or vice versa. In another example, the second media item may require or prefer a media advertisement that has a certain quality that is not satisfied by the firs pre-roll media advertisement. In yet another example, the second media item may require or prefer media advertisements that are associated with a certain content type or audience type where the first pre-roll media advertisement is not associated with the certain content or audience type. For instance, where the second media item is a children's video, the second media item may not allow media advertisements with content targeted for adults to be shown in association therewith. In another example, where the second media item is a video that is targeted for a male audience, the second media item may not allow media advertisements with content targeted for a female audience to be associated therewith.

According to this aspect, rather than allowing an advertisement to be imposed onto a media item for which it is not suitable, regulation component 110 is configured to identify discrepancies associated with features of a media advertisement (e.g., a pre-roll advertisement) that is carried over to a new media item and features of a media advertisement allowed or preferred for association with the new media item. Regulation component 110 can then implement various protocols to account for these discrepancies.

For example regulation component 110 can identify a restriction related to a type of a media advertisement (e.g., in-stream pre-roll, mid-roll, post-roll, in-video display, etc.) for playing in association with the second media item. In response to a determination that a first pre-roll advertisement playing at the time of selection of the second media item does not satisfy the restriction, regulation component 110 can implement a various protocols depending on the nature of the discrepancy. For instance, regulation component 110 can replace the first pre-roll media advertisement with a new pre-roll media advertisement that satisfies the restriction. According to this example, regulation component 110 can select the replacement pre-roll media advertisement based on a duration of time the first pre-roll media advertisement was watched. In another example, advertisement component 104 can continue to play the first pre-roll advertisement before the second media item and then play another media advertisement that satisfies the restriction in association with playing of the second media item.

In another example, a regulation component 110 can identify a restriction related to duration of a pre-roll media advertisement for playing in association with the second media item. In response to a determination that the first pre-roll advertisement does not satisfy the restriction (e.g., the first pre-roll advertisement is too short), advertisement component 104 can continue to play the first pre-roll media advertisement before the second media item and then play another pre-roll media advertisement after completion of the first pre-roll media advertisement and prior to playing of the second media item. According to this example, the other pre-roll media advertisement can be selected based on a cumulative duration of the first pre-roll media advertisement and the other pre-roll media advertisement.

In another example, a regulation component 110 can identify a restriction related to skippability (e.g., whether it can be skipped and when it can be skipped) of a pre-roll media advertisement for playing in association with the second media item. In response to a determination that the first pre-roll advertisement does not satisfy the restriction, regulation component 110 can modify the skippable aspects of the first pre-roll media advertisement to satisfy the restriction. For example, where the first pre-roll media advertisement is skippable and the second media item does not allow or prefer skippable pre-roll advertisements, regulation component 110 can make the first pre-roll advertisement not skippable when it is played before the second media item. Similarly, where the first pre-roll media advertisement is not skippable and the second media item requires or prefers skippable pre-roll advertisements, regulation component 110 can make the first pre-roll advertisement skippable when it is played before the second media item. In other aspects, regulation component 110 can modify a minimum duration of watch time before a first pre-roll media advertisement become skippable. For example, where the first pre-roll media advertisement is skippable after 5 seconds and the second media item requires or prefers pre-roll advertisements that are skippable after 15 seconds, regulation component 110 can make the first pre-roll advertisement skippable after 15 seconds as opposed to 5 seconds when it is played before the second media item.

In yet another example, a regulation component 110 can identify a restriction related to content or audience type of a pre-roll media advertisement for playing in association with the second media item. In response to a determination that the first pre-roll advertisement does not satisfy the restriction, regulation component 110 can replace the first pre-roll media advertisement with a new pre-roll media advertisement (or other type of advertisement) that satisfies the restriction.

In another aspect, regulation component 110 is configured to identify discrepancies associated with features of a media item to which a previously playing media advertisement will be carried over (e.g., a media item selected for playing while the media advertisement was playing), and features of media items allowed or preferred for association with the media advertisement. For example, regulation component 110 can determine that the previously playing media advertisement is only allowed or preferred for association with media items having a particular quality, associated with a particular content type or rating, and/or associated with a particular audience. In response to a determination that the media item does not satisfy a restriction associated with the previously playing media advertisement, regulation component 110 can block advertisement component 104 from continuing to play the previously playing advertisement before the media item.

Figure 2:
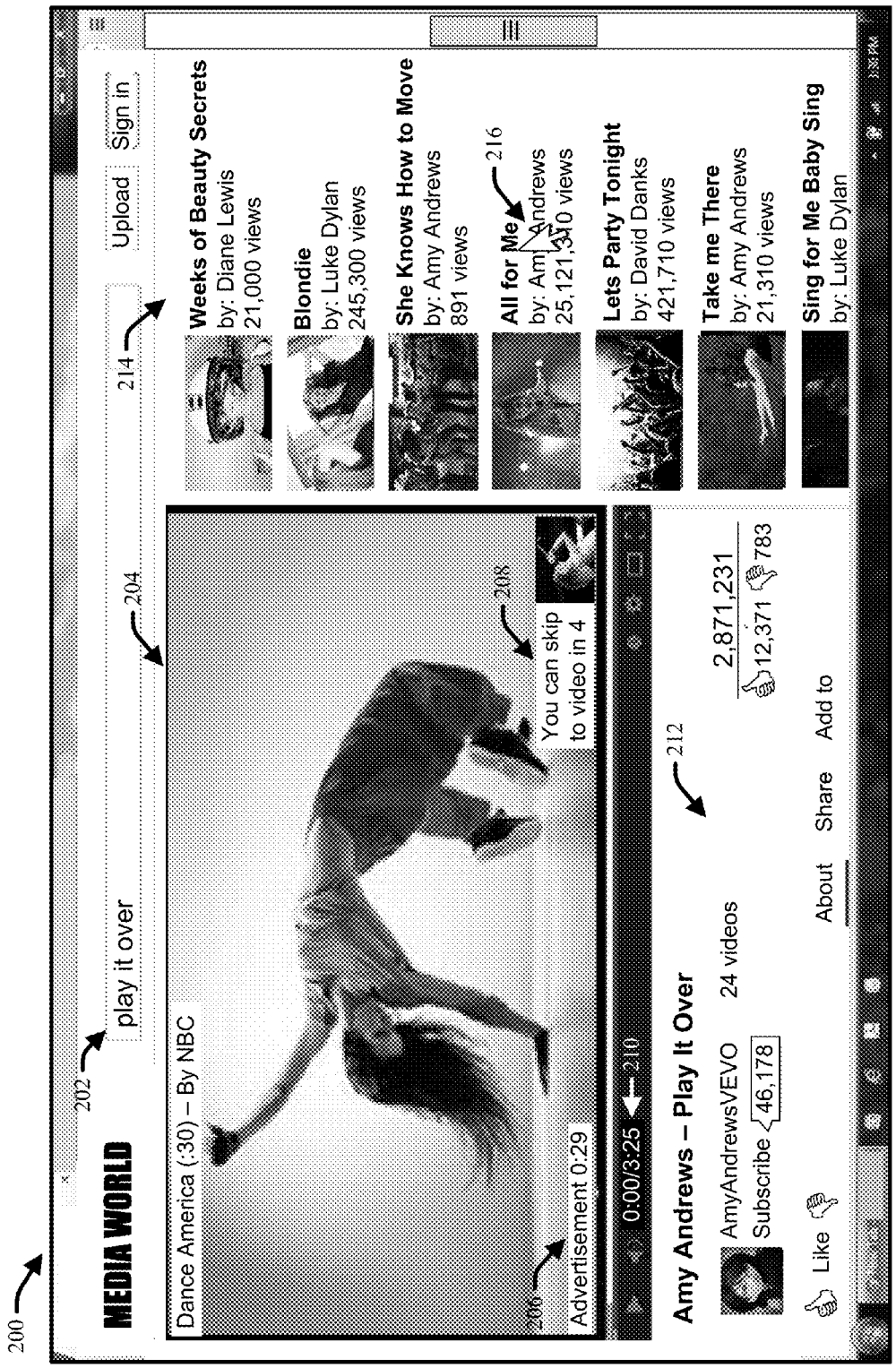
FIGS. 2-3 respectively present example graphical user interfaces that facilitate viewing streaming media in association with in-stream advertisements in accordance with various aspects and embodiments described herein.
Figure 3:
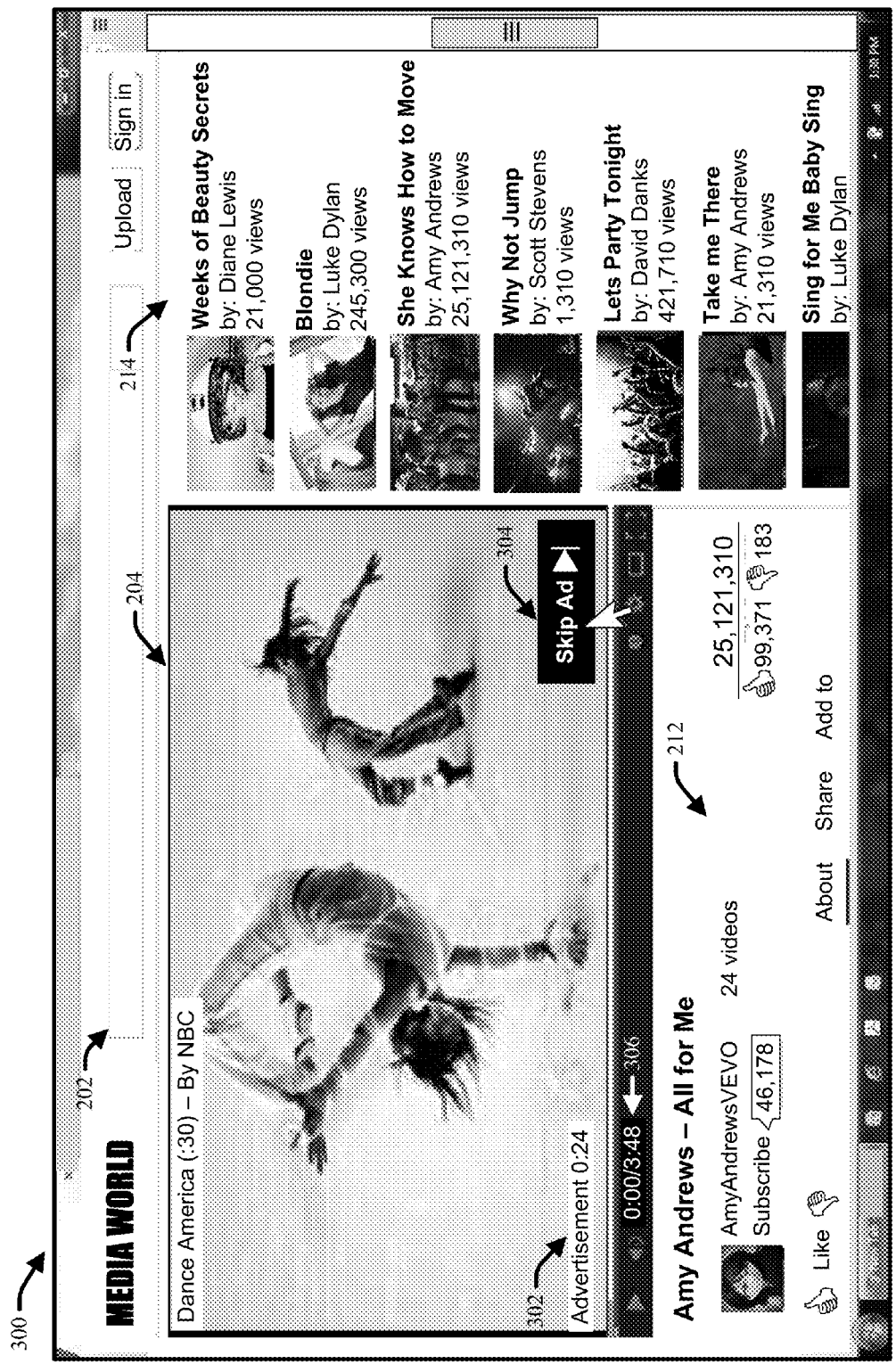

FIGS. 2-3 respectively present example graphical user interfaces 200 and 300 configured by streaming media provider 102 that facilitate viewing streaming media in association with in-stream advertisements. Combined interfaces 200 and 300 visually demonstrate continuous playing of a pre-roll media advertisement that was playing within a video player of a GUI at the time a new video was selected and loaded for playing in the video player (or a new video player object associated with a refreshed/reloaded HTML page). In particular, interface 200 depicts a first GUI generated in response to user selection of a first media item for viewing and interface 300 depicts a second GUI generated in response to user selection of a second media item for viewing from a feed provided in the first GUI while a pre-roll video advertisement was playing in the first GUI.

With reference to FIG. 2, interface 200 includes a video player 204 that is currently playing a skippable pre-roll video advertisement for "Dance America" by NBC, as noted in the upper left hand corner of the video player. The advertisement is 30 seconds long and has 29 seconds of playing time remaining, as indicated by the time counter 206 in the lower left hand corner of the video player, (e.g., the advertisement has played for 1 second). The advertisement is skippable after 5 seconds of playing time. An icon 208 is displayed in the lower right hand corner of the video player indicating the amount of time remaining before the advertisement can be skipped.

The pre-roll advertisement currently playing in the video player 204 is configured to play in response to selection of a media item. After the pre-roll advertisement has completed playing or is skipped, the selected media item will begin playing. In particular, the selected media item that is configured to begin playing following completion or skipping of the pre-roll advertisement is entitled "Play it Over" by Amy Andrews. As seen in section 210 of the video player, a time clock is depicted that indicates the amount of time played out of the total duration of the video is 0:00/3:25. In an aspect, a user selected the video "Play it Over" by entering the title into a search query 202 of the GUI. Section 212 of interface 200 can include various information about the selected video.

Section 214 of interface 200 includes a feed of other possible media items that the user may select for playing. For example, section 214 can include a list of recommended media items, or a list of media items related to the selected video "Play it Over." A cursor 216 is located over one of the media items entitled "All for Me," also by Amy Andrews.

FIG. 3 depicts another interface 300 generated in response to selection of the media item entitled "All for Me" from section 214 of interface 200 prior to completion of the playing of the pre-roll media advertisement for "Dance America." In particular, interface 300 was generated in response to selection of the media item "All for Me" from section 214 of interface 200 when the pre-roll advertisement had 29-24 seconds remaining of playing time (e.g., when the pre-roll advertisement was played between 1-6 seconds). For example, as seen in the upper right hand corner of the video player of interface 300, the pre-roll advertisement playing in the video player is for "Dance America," the same pre-roll advertisement that was playing in the video player of interface 200. In interface 300, the pre-roll advertisement now has 24 seconds remaining, as indicated by the time counter 302 in the lower left hand corner of the video player, (e.g., the advertisement has now played for 6 second) and the video image data for the pre-roll advertisement has changed as the video has progressed.

The selected video "All for Me" has now been loaded for playing in the video player 204 following completion of the pre-roll advertisement or skipping of the pre-roll advertisement as opposed to the video "Play it Over." For example, the information in section 212 has been updated with information for "All for Me" as opposed to the previously selected video "Play it Over." In addition, as seen in section 306 of the video player, a time clock is depicted that indicates the amount of time played out of the total duration of the upcoming video "All for Me" is 0:00/3:48. Further, a skip advertisement icon 304 has been generated in the lower right hand corner of the video player because the pre-roll advertisement has now played for the minimum amount of time of 5 seconds. At this point, the user can either continue watching the pre-roll advertisement or select the skip advertisement icon 304 to begin playing the video "All for Me."

Figure 4:
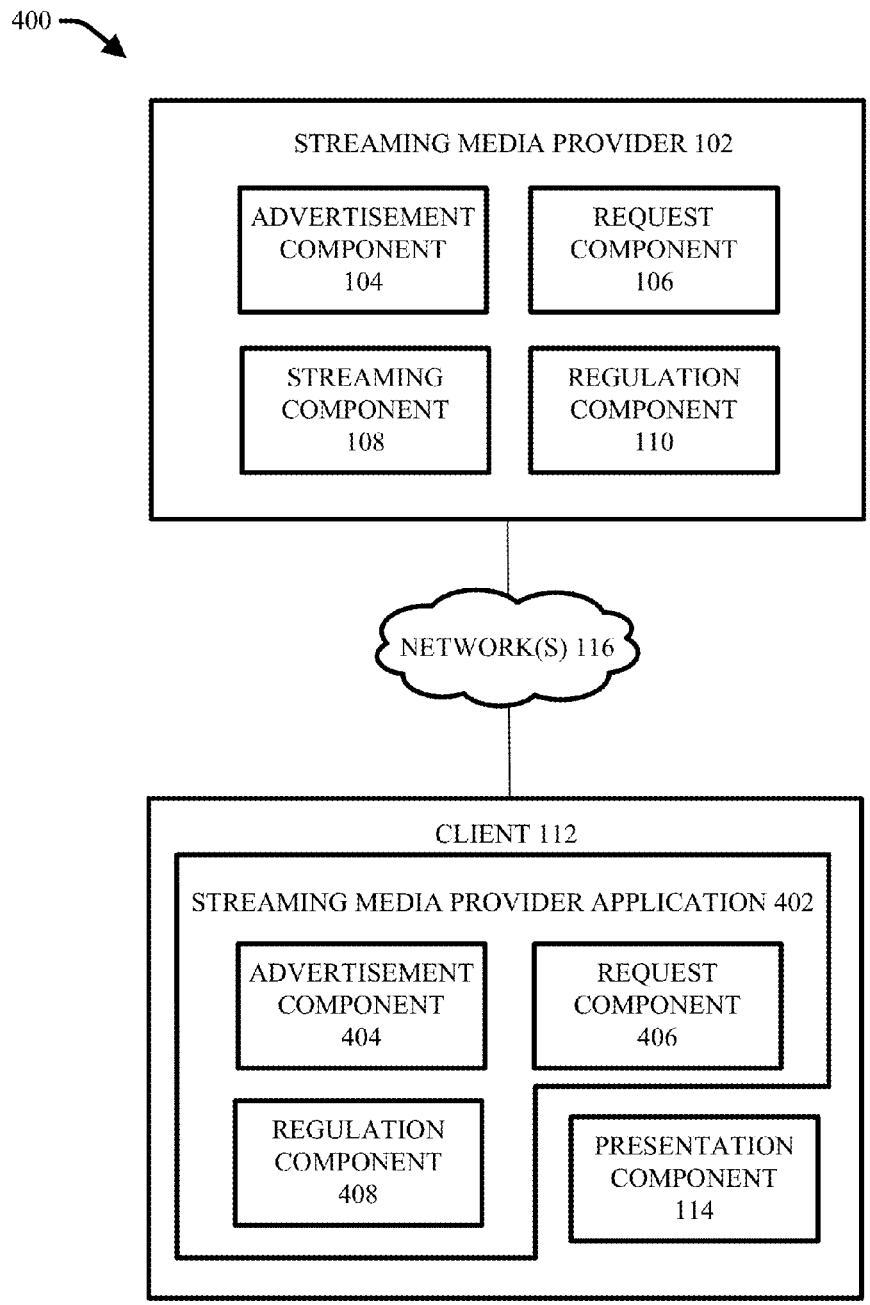
FIG. 4 illustrates another example system for synchronizing advertisement playback across navigation experiences and transitional states in accordance with various aspects and embodiments described herein.

FIG. 4 presents another example system 400 that facilitates synchronizing advertisement playback across navigation experiences and transitional states in accordance with various aspects and embodiments described herein. System 400 can include same or similar features and functionalities as system 100. Repetitive description of like elements employed in respective embodiments of systems and components described herein are omitted for sake of brevity.

System 400 particularly demonstrates an architecture wherein a client device 112 includes a client version of streaming media provider 102, streaming media provider application 402, to facilitate aspects of streaming media provider 102 in accordance with a mobile operating system of the client device 112. According to this embodiment, client device 402 can include a mobile device, such as a smartphone, a tablet PC, and the like and streaming media provider can operate in accordance with a mobile application service provider.

Streaming media provider application 402 can include advertisement component 404, request component 406 and regulation component 408. These components can provide same or similar features and functionalities of advertisement component 104, request component 106 and regulation component 110 discussed with respect to FIG. 1. For example, advertisement component 404 can be configured to play a pre-roll media advertisement (streamed/provided to client 112 by streaming media provider 102 via a network 106) that is associated with a first media item prior to playing of the first media item. Request component 406 can be configured to receive a request to play a second media item prior to completion of the pre-roll media advertisement. Request component can relay this request to streaming media provider 102 which in turn can initiate streaming of the second media item to client 112. However, prior to playing the second media item, advertisement component 404 can continue to play the pre-roll media advertisement.

In addition, streaming media provider application 402 can generate and employ a feature referred to herein as a "mini player" to facilitate providing media advertisements. In particular, streaming media provider application 402 can generate a GUI that includes a mini media player and facilitates navigating media content provided by streaming media provider 102. Presentation component 114 can display the GUI via display screen of the device 112.

In an aspect, the mini player is configured to take up a relatively small area of the GUI and allow a user to play a video within the mini player and continue to browse other features of the GUI. For example, the mini media player can be provided within a window that is configured to float over or overlay other features the GUI. For example, the GUI can include a menu or scrollable feed of media items that are available for selection and the mini player can float over the media items in a lower right hand corner of the display screen. In an aspect, the mini player can be resized, moved around, minimized and/or maximized. The mini player is configured to remain visible as features of the graphical user interface change or move in response to user navigation about the GUI. For example, as a user scrolls about a feed of media items or selects different features and menus of the GUI, the mini player can remain in the forefront of the GUI and continue playing a media item that was playing therein. As a result, a user can play a video within the mini player and continue to navigate other aspects of the GUI without having to pause the video.

In an aspect, advertisement component 404 is configured to employ the mini player to play an advertisement when the mini player is not otherwise being used to play a media item. For example, advertisement component 404 can determine that the mini player is not playing a user requested video and begin playing an advertisement within the mini player. According to this aspect, when a user selects a video to watch while an advertisement is being played in the mini player, rather than loading a new pre-roll advertisement and playing it from the beginning in association with the new video, advertisement component 404 can continue to play the advertisement that was previously playing in the mini player. Advertisement component 404 can continue playing the advertisement in the mini player or a primary (e.g., larger) media player generated in response to the selection of the media item in which the selected media item will be played.

In an aspect, when the advertisement is finished, streaming media provider application 402 can then play the selected video (e.g., in the mini player or the other player). In another aspect, the advertisement can be skippable after playing for a minimum duration. According to this aspect, after the advertisement has played for the minimum duration including the amount of time it was played prior to the selection of the media item, it can become skippable. In another aspect, advertisement component 404 can cause the advertisement to become skippable after the advertisement has played for the minimum duration excluding the amount of time it was played prior to the selection of the media item.

It should be appreciated that the various aspects of streaming media provider application 402 can be extended to streaming media provider 102 and vice versa. For example, streaming media provider 102 can configure a GUI that includes and employs a mini player in the manner described in association with streaming media provider application 402.

Figure 5:
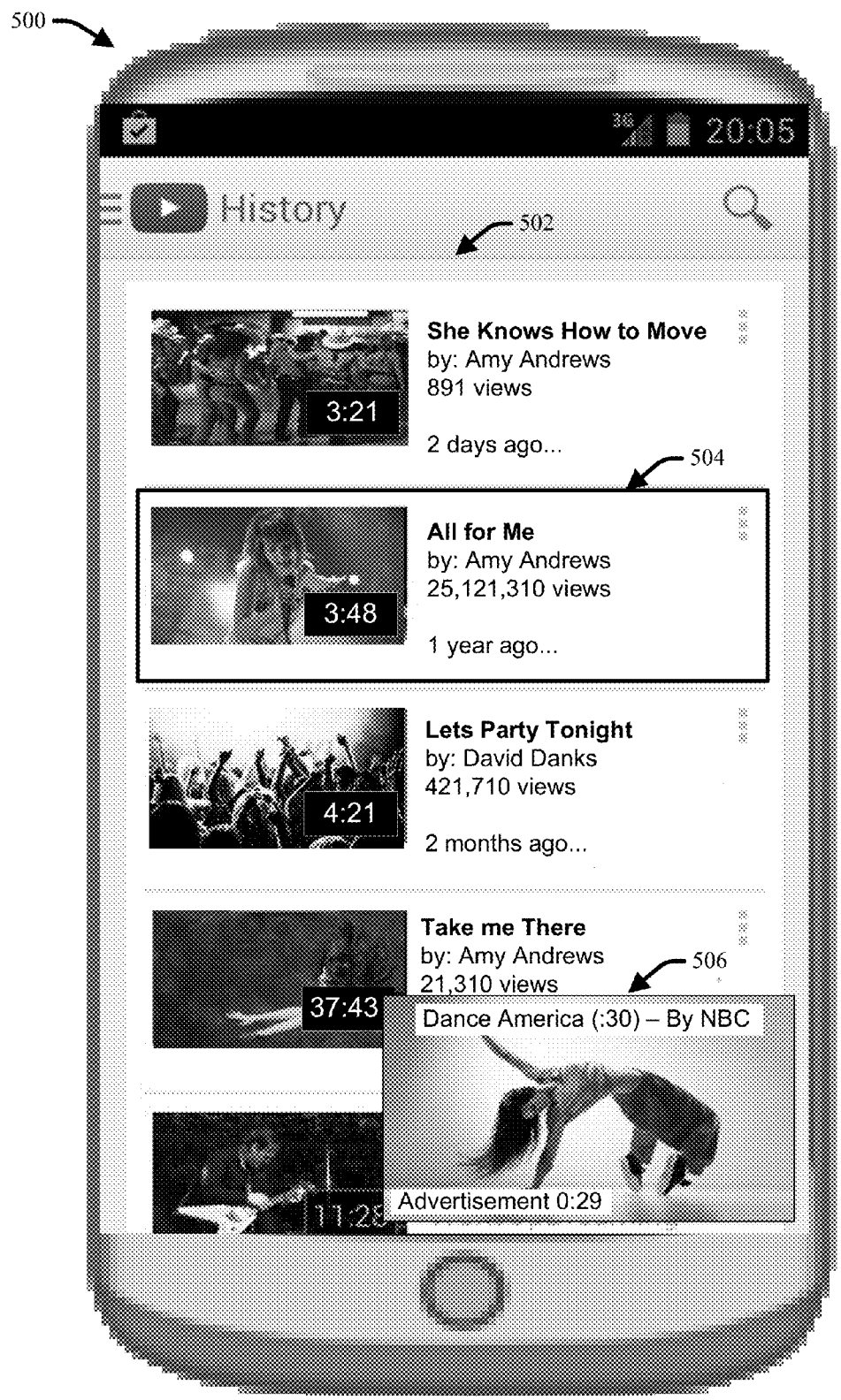
FIGS. 5-6 respectively present example graphical user interfaces that facilitate viewing streaming media in association with in-stream advertisements provided in a mini player, in accordance with various aspects and embodiments described herein.
Figure 6:

FIGS. 5-6 respectively present example graphical user interfaces 500 and 600 configured by streaming media provider 102 and/or streaming media provider application 402 that facilitate viewing streaming media in association with in-stream advertisements provided in a mini player. Combined interfaces 500 and 600 visually demonstrate continuous playing of a pre-roll media advertisement that was playing within a first video player of a GUI (e.g., a mini player) at the time a new video was selected and loaded for playing in a primary video player. In particular, interface 500 depicts a first GUI that includes a video advertisement playing in a mini-player and interface 600 depicts a second GUI generated in response to user selection of a second media item for viewing from a feed provided in the first GUI while the video advertisement was playing in the mini player.

With reference to FIG. 5, interface 500 includes a scrollable feed 502 with a plurality of different media items available for selection and viewing. The respective media items each include thumbnail images representing the respective media items and general information describing the respective media items. Interface 500 also include a mini player 506 in the lower right hand corner that is currently playing a video advertisement for "Dance America" by NBC, as noted at the top the video player. The advertisement is 30 seconds long and has 29 seconds of playing time remaining, as indicated by the time counter in the lower left hand corner of the video player, (e.g., the advertisement has played for 1 second). In an aspect, the mini player 506 began playing the advertisement for "Dance America" in response to a determination that the mini player was not otherwise playing a media item. In another aspect, the mini player 506 began playing the advertisement for "Dance America" in response to selection of a media item for playing in the mini player.

The mini player 506 is configured to remain visible and play the advertisement as a user navigates the scrollable feed 502. For example, the mini player can float or hover over other aspects and icons of interface 500 as they change and/or move. In an aspect, the mini player can be moved around and resized to the user's liking. A selection box 504 is formed around one of the media items in the feed entitled "All for Me" by Amy Andrews.

FIG. 6 depicts an interface 600 generated in response to selection of the media item entitled "All for Me" from feed 502 of interface 500 prior to completion of the playing of the media advertisement for "Dance America" in the mini player 506. In particular, interface 600 was generated in response to selection of the media item "All for Me" from feed 502 of interface 500 when the media advertisement had 29-24 seconds remaining of playing time (e.g., when the advertisement was played between 1-6 seconds). In response to selection of the video "All for Me" from feed 502 of interface 500, a primary media player 602 is generated and the video "All for Me" is loaded for playing in the primary media player. For example, section 606 includes information regarding the selected video "All for Me." However, as seen by time clock 604 within the video player 602, the video "All for Me" has not yet begun playing (e.g., time clock 604 indicates the amount of time played out of the total duration of the upcoming video "All for Me" is 0:00/3:48).

On the contrary, because the video "All for Me" was selected in interface 500 before the advertisement playing in the mini player of interface 500 was complete, the advertisement is carried over for continued playing in the primary media player 602 of interface 600 (e.g., as opposed to restarting the advertising process and stopping the advertisement playing in the mini player or). In an aspect, because the video "All for Me" was selected in interface 500 before the advertisement playing in the mini player of interface 500 was complete, another advertisement is not loaded for playing before the selected video "All for Me." For example, after the advertisement for "Dance America" completes playing in the primary media player 602, the video "All for Me" can begin playing.

Figure 7:
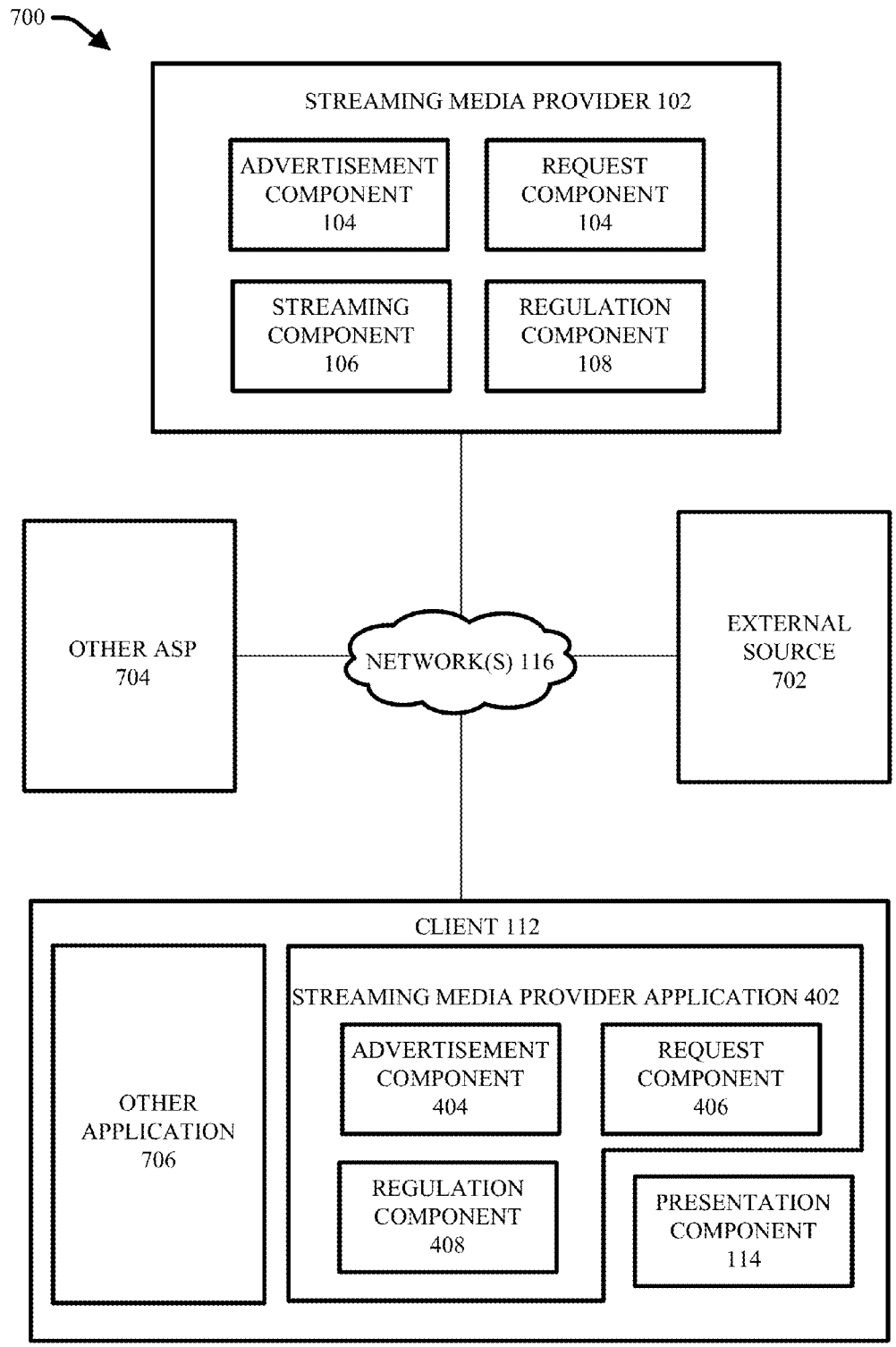
FIG. 7 illustrates another example system for synchronizing advertisement playback across navigation experiences and transitional states in accordance with various aspects and embodiments described herein.

FIG. 7 presents another example system 700 that facilitates synchronizing advertisement playback across navigation experiences and transitional states in accordance with various aspects and embodiments described herein. System 700 can include same or similar features and functionalities as system 400. Repetitive description of like elements employed in respective embodiments of systems and components described herein are omitted for sake of brevity.

System 700 provides an example architecture that facilitate continued playback of a media advertisement that was playing at a time when a user transitions to a new application, device or webpage. In an aspect, with system 700 streaming media provider 102 can effectuate continued playback of a media advertisement at the streaming media provider's network platform (e.g., website or mobile application) when playing of the media advertisement was initiated at an external source 702 in association with a media item, provided by streaming media provider 102, that was transferred for playing at the streaming media provider 102. For example, the external source 702 can include a remote networking system or remote device. Similarly, system 700 provides an example architecture wherein streaming media provider application 402 can effectuate continued playback of a media advertisement associated with a media item provided by streaming media provider 102 when playing of the media advertisement was initiated at or by another application in association with the media item and transferred to streaming media provider application 402. For example, the other application 704 can include a messaging application or other type of application configured to render embedded media players configured to play media items with pre-roll advertisements hosted by streaming media provider 102 and including links to open the media items using streaming media provider application 402.

According to this embodiment, a user can begin watching a media item, provided by media provider that is located at an external source 702 or other application 706, (wherein the other application is serviced by an external ASP 704). For example, the external source 702 or application 706 can include an embedded video player configured to play the media item at the external source or application 706, respectively. The media item can further be associated with a link to the media item configured to open the media item a website platform or mobile application platform provided by streaming media provider 102. The user can further select the link to open and watch the media item at the website platform or mobile application platform of the streaming media provider 102 as opposed to the external source 702 or application 706. Prior to playing of the media item at the external source or application, a pre-roll advertisement can be configured to begin playing at the external source 702 or application 706 within the embedded video player.

When the user selects the link prior to completion of the pre-roll advertisement, rather than restarting the pre-roll advertising process when the media item is opened at the steaming media provider website or mobile application platform, advertisement component 104 or 404 can continue playing the pre-roll advertisement where it left off when the link was selected. When the pre-roll advertisement is completed or skipped, the media item can then begin playing. According to this aspect, the external source 702 or application 706 can pass along a token with a request to open the media item at the streaming media provider platform that identifies the pre-roll media advertisement and a time stamp identifying the point to which the pre-roll media advertisement was played at the time the request was initiated. Advertisement component 104 or 404 can then employ this token to begin playing the media advertisement at or near this point when the media item is opened at the streaming media provider website.

Figure 8:
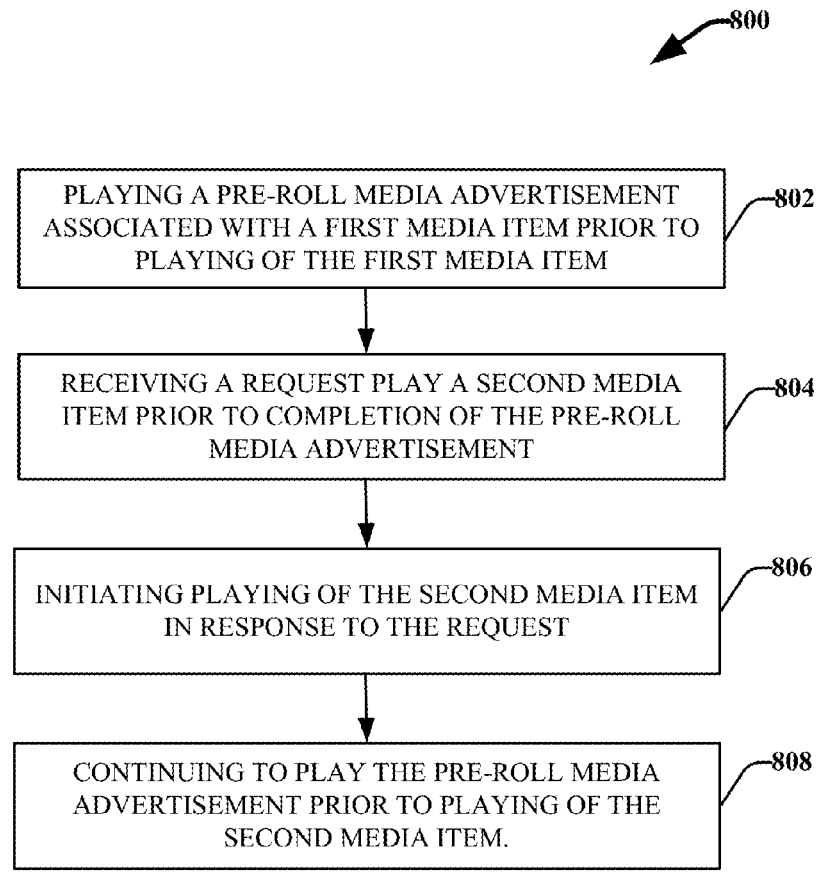
FIG. 8 is a flow diagram of an example method for synchronizing advertisement playback across navigation experiences and transitional states in accordance with various aspects and embodiments described herein.
Figure 9:
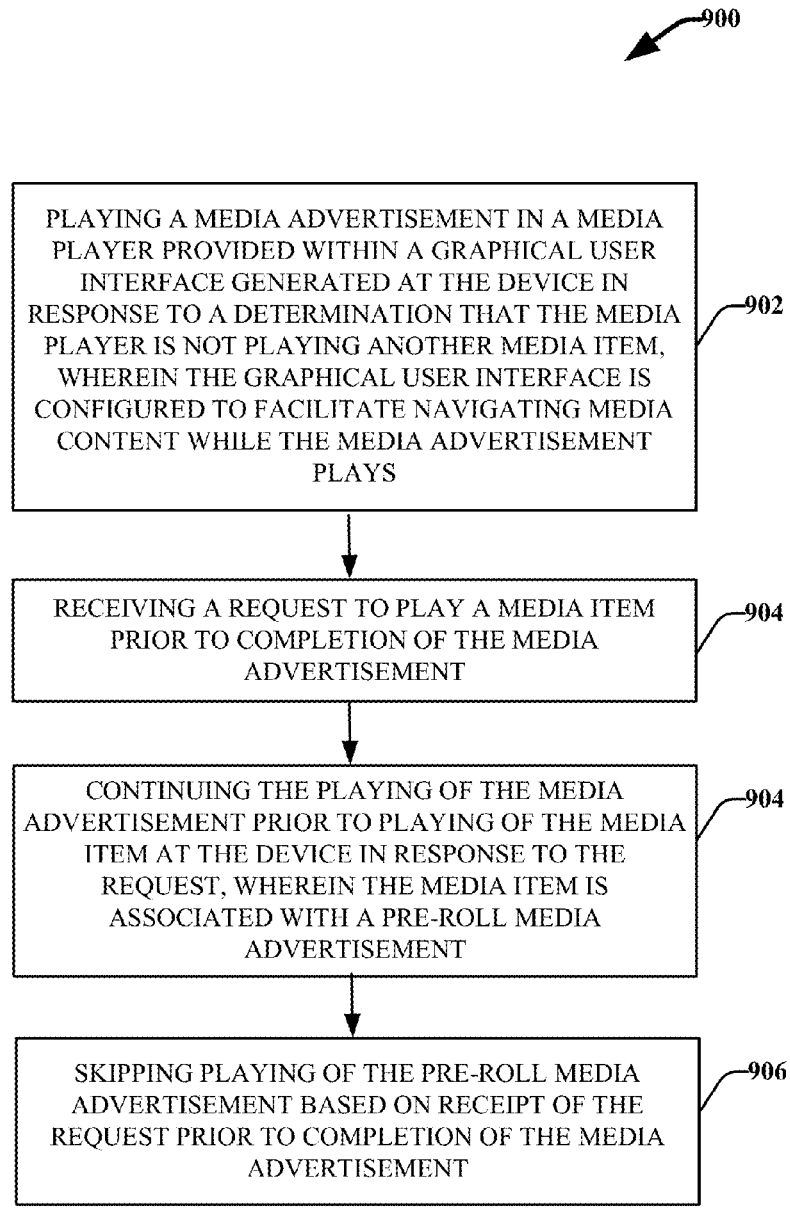
FIG. 9 is a flow diagram of another example method for synchronizing advertisement playback across navigation experiences and transitional states in accordance with various aspects and embodiments described herein.

In view of the example systems and/or devices described herein, example methods that can be implemented in accordance with the disclosed subject matter can be further appreciated with reference to flowcharts in FIGS. 8-9. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example method 800 for synchronizing advertisement playback across navigation experiences and transitional states in accordance with various aspects and embodiments described herein. At 802, a pre-roll media advertisement associated with a first media item is played prior to playing of the first media item (e.g., via streaming media provider 102). At 804, a request to play a second media item is received (e.g., via request component 106) prior to completion of the pre-roll media advertisement. At 806, playing of the second media item is initiated in response to the request (e.g., via streaming component 110). At 808, playing of the pre-roll media advertisement is continued prior to the playing of the second media item (e.g., via advertisement component 104).

FIG. 9 illustrates a flow chart of another example method 900 for synchronizing advertisement playback across navigation experiences and transitional states in accordance with various aspects and embodiments described herein. At 902, a device (e.g., device 112) plays a media advertisement in a media player provided within a graphical user interface generated at the device in response to a determination that the media player is not playing another media item, wherein the graphical user interface is configured to facilitate navigating media content while the media advertisement plays. At 904, a request to play a media item prior to completion of the media advertisement is received (e.g., via request component 406). At 904, the playing of the media advertisement is continued prior to playing of the media item at the device in response to the request, wherein the media item is associated with a pre-roll media advertisement. At 906, playing of the pre-roll media advertisement is skipped (e.g., via advertisement component 404) based on receipt of the request prior to completion of the media advertisement.

Figure 10:
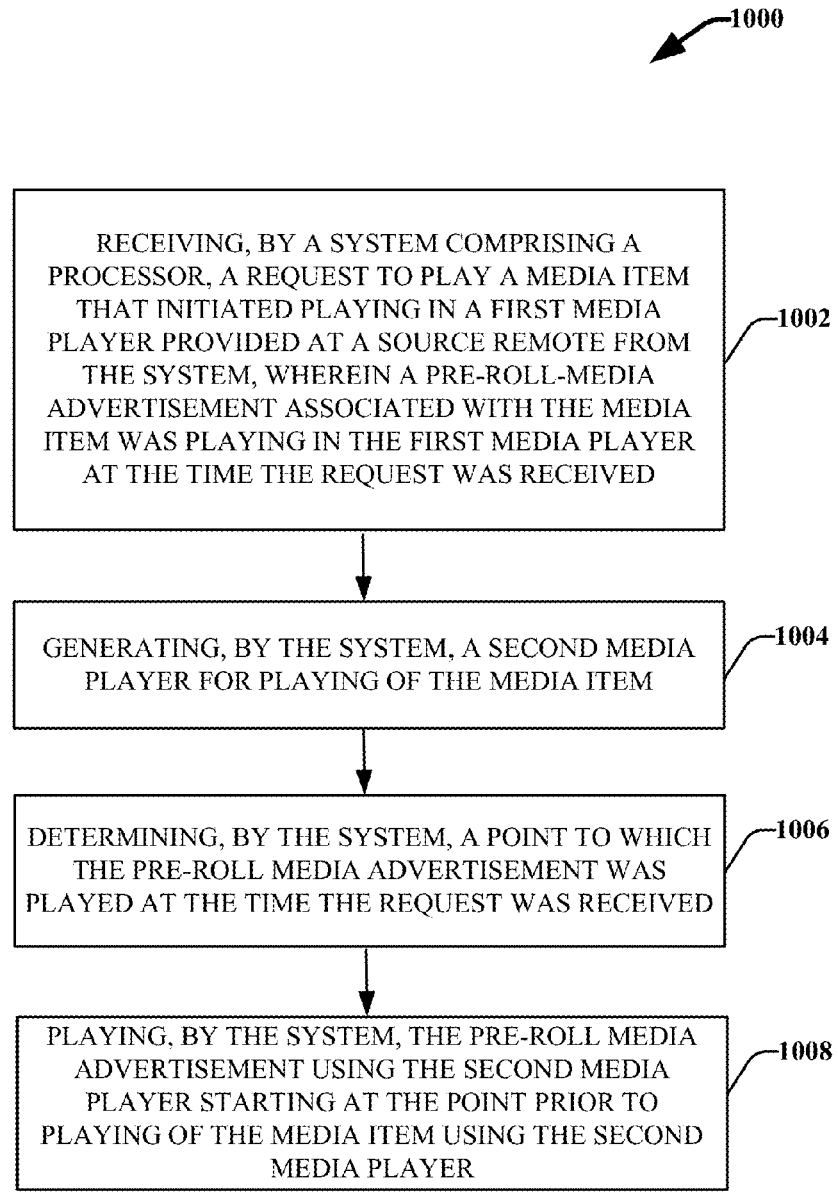
FIG. 10 is a flow diagram of another example method for synchronizing advertisement playback across navigation experiences and transitional states in accordance with various aspects and embodiments described herein.

FIG. 10 illustrates a flow chart of another example method 1000 for synchronizing advertisement playback across navigation experiences and transitional states in accordance with various aspects and embodiments described herein. At 1002, a system comprising a processor (e.g., streaming media provider 102 or streaming media provider application 402) receives a request to play a media item that initiated playing in a first media player provided at a source remote from the system, wherein a pre-roll-media advertisement associated with the media item was playing in the first media player at the time the request was received. At 1004, the system generates a second media player for playing of the media item. At 1006, the system determines a point to which the pre-roll media advertisement was played at the time the request was received. At 1008, the system then plays the pre-roll media advertisement using the second media player starting at the point, prior to playing of the media item using the second media player.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 11:
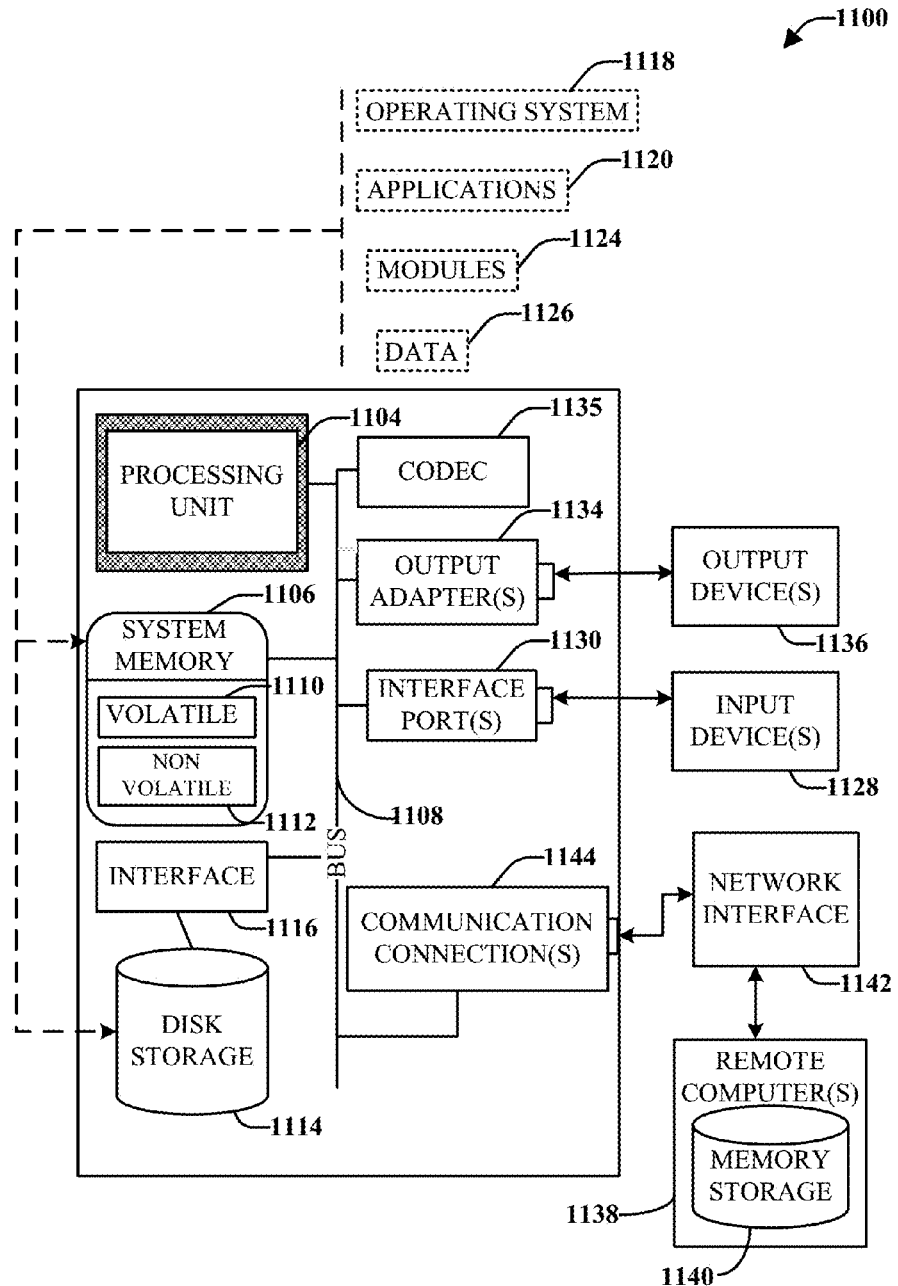
FIG. 11 is a schematic block diagram illustrating a suitable operating environment in accordance with various aspects and embodiments.

With reference to FIG. 11, a suitable environment 1100 for implementing various aspects of the claimed subject matter includes a computer 1102. The computer 1102 includes a processing unit 1104, a system memory 1106, a codec 1105, and a system bus 1108. The system bus 1108 couples system components including, but not limited to, the system memory 1106 to the processing unit 1104. The processing unit 1104 can be any of various available processors. Dual microprocessors and other multiprocessor architectures also can be employed as the processing unit 1104.

The system bus 1108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 13114), and Small Computer Systems Interface (SCSI).

The system memory 1106 includes volatile memory 1110 and non-volatile memory 1112. The basic input/output system (BIOS), containing the basic routines to transfer information between elements within the computer 1102, such as during start-up, is stored in non-volatile memory 1112. In addition, according to present innovations, codec 1105 may include at least one of an encoder or decoder, wherein the at least one of an encoder or decoder may consist of hardware, a combination of hardware and software, or software. Although, codec 1105 is depicted as a separate component, codec 1105 may be contained within non-volatile memory 1112. By way of illustration, and not limitation, non-volatile memory 1112 can include read only memory (ROM), programmable ROM (PROM), electrically programmable ROM (EPROM), electrically erasable programmable ROM (EEPROM), or flash memory. Volatile memory 1110 includes random access memory (RAM), which acts as external cache memory. According to present aspects, the volatile memory may store the write operation retry logic (not shown in FIG. 11) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1102 may also include removable/non-removable, volatile/non-volatile computer storage medium. FIG. 11 illustrates, for example, disk storage 1114. Disk storage 1114 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1114 to the system bus 1108, a removable or non-removable interface is typically used, such as interface 1116.

It is to be appreciated that FIG. 11 describes software that acts as an intermediary between users and the basic computer resources described in the suitable operating environment 1100. Such software includes an operating system 1118. Operating system 1118, which can be stored on disk storage 1114, acts to control and allocate resources of the computer system 1102. Applications 1120 take advantage of the management of resources by operating system 1118 through program modules 1124, and program data 1126, such as the boot/shutdown transaction table and the like, stored either in system memory 1106 or on disk storage 1114. It is to be appreciated that the claimed subject matter can be implemented with various operating systems or combinations of operating systems.

A user enters commands or information into the computer 1102 through input device(s) 1128. Input devices 1128 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1104 through the system bus 1108 via interface port(s) 1130. Interface port(s) 1130 include, for example, a serial port, a parallel port, a game port, and a universal serial bus (USB). Output device(s) 1136 use some of the same type of ports as input device(s). Thus, for example, a USB port may be used to provide input to computer 1102, and to output information from computer 1102 to an output device 1136. Output adapter 1134 is provided to illustrate that there are some output devices 1136 like monitors, speakers, and printers, among other output devices 1136, which require special adapters. The output adapters 1134 include, by way of illustration and not limitation, video and sound cards that provide a means of connection between the output device 1136 and the system bus 1108. It should be noted that other devices and/or systems of devices provide both input and output capabilities such as remote computer(s) 1138.

Computer 1102 can operate in a networked environment using logical connections to one or more remote computers, such as remote computer(s) 1138. The remote computer(s) 1138 can be a personal computer, a server, a router, a network PC, a workstation, a microprocessor based appliance, a peer device, a smart phone, a tablet, or other network node, and typically includes many of the elements described relative to computer 1102. For purposes of brevity, only a memory storage device 1140 is illustrated with remote computer(s) 1138. Remote computer(s) 1138 is logically connected to computer 1102 through a network interface 1142 and then connected via communication connection(s) 1144. Network interface 1142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1144 refers to the hardware/software employed to connect the network interface 1142 to the bus 1108. While communication connection 1144 is shown for illustrative clarity inside computer 1102, it can also be external to computer 1102. The hardware/software necessary for connection to the network interface 1142 includes, for exemplary purposes only, internal and external technologies such as, modems including regular telephone grade modems, cable modems and DSL modems, ISDN adapters, and wired and wireless Ethernet cards, hubs, and routers.

Figure 12:
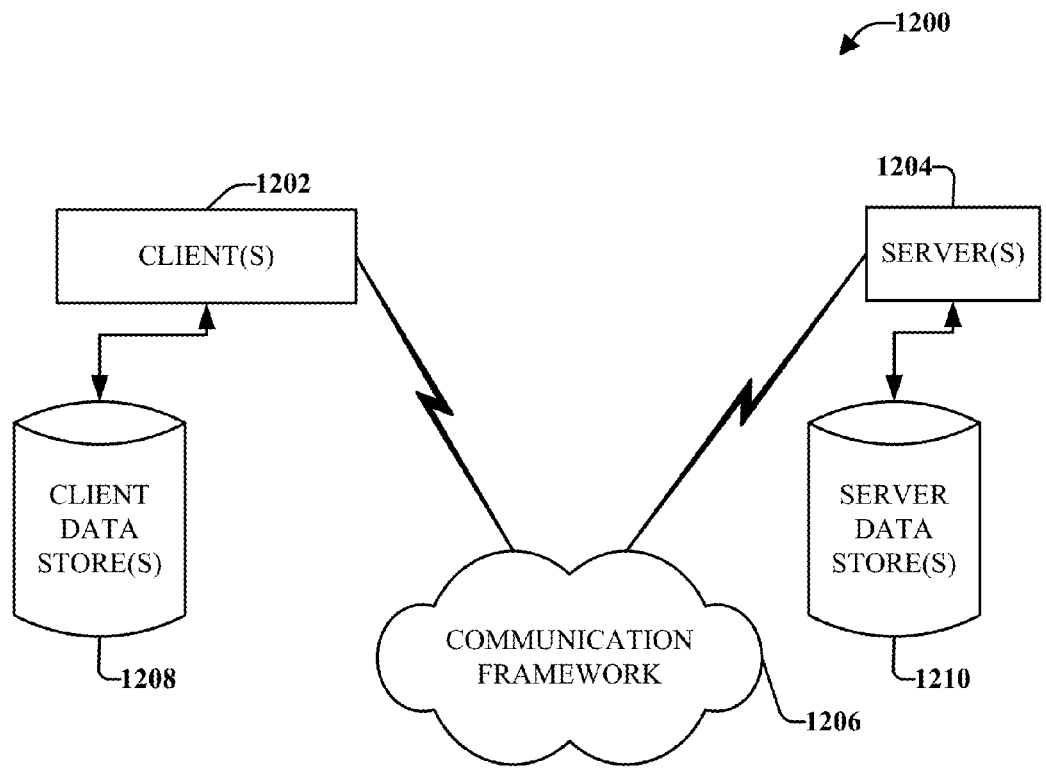
FIG. 12 is a schematic block diagram of a sample-computing environment in accordance with various aspects and embodiments.

Referring now to FIG. 12, there is illustrated a schematic block diagram of a computing environment 1200 in accordance with this disclosure. The system 1200 includes one or more client(s) 1202 (e.g., laptops, smart phones, PDAs, media players, computers, portable electronic devices, tablets, and the like). The client(s) 1202 can be hardware and/or software (e.g., threads, processes, computing devices). The system 1200 also includes one or more server(s) 1204. The server(s) 1204 can also be hardware or hardware in combination with software (e.g., threads, processes, computing devices). The servers 1204 can house threads to perform transformations by employing aspects of this disclosure, for example. One possible communication between a client 1202 and a server 1204 can be in the form of a data packet transmitted between two or more computer processes wherein the data packet may include video data. The data packet can include a metadata, e.g., associated contextual information, for example. The system 1200 includes a communication framework 1206 (e.g., a global communication network such as the Internet, or mobile network(s)) that can be employed to facilitate communications between the client(s) 1202 and the server(s) 1204.

Communications can be facilitated via a wired (including optical fiber) and/or wireless technology. The client(s) 1202 include or are operatively connected to one or more client data store(s) 1208 that can be employed to store information local to the client(s) 1202 (e.g., associated contextual information). Similarly, the server(s) 1204 are operatively include or are operatively connected to one or more server data store (s) 1210 that can be employed to store information local to the servers 1204.

In one embodiment, a client 1202 can transfer an encoded file, in accordance with the disclosed subject matter, to server 1204. Server 1204 can store the file, decode the file, or transmit the file to another client 1202. It is to be appreciated, that a client 1202 can also transfer uncompressed file to a server 1204 and server 1204 can compress the file in accordance with the disclosed subject matter. Likewise, server 1204 can encode video information and transmit the information via communication framework 1206 to one or more clients 1202.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system, comprising:
    a memory device that stores computer executable instructions;
    at least one processor that executes the computer executable instructions stored in the memory which causes the at least one processor to:
        receive, from a client device, a request for a first media item;
        in response to the request for the first media item, cause a pre-roll media advertisement associated with the first media item to be sent to the client device;
        cause the client device to play, in a media player provided within a graphical user interface displayed by the client device, the pre-roll media advertisement prior to playback of the first media item;
        in response to the request for the first media item, cause the first media item to be sent to the client device during playback of the pre-roll media advertisement such that the client device buffers at least a portion of the first media item during playback of the pre-roll media advertisement;
        cause a plurality of selectable user interface elements each corresponding to at least one media item, including a selectable user interface element corresponding to a second media item, to be displayed within the graphical user interface during playback of the pre-roll advertisement;
        to receive, from the client device, a request for the second media item prior to completion of the pre-roll media advertisement that was made via the selectable user interface element corresponding to the second media item;
        in response to the request for the second media item, cause the second media item to be sent to the client device during playback of the pre-roll media advertisement such that the client device buffers at least a portion of the second media item during playback of the pre-roll media advertisement;
        identify a restriction related to content of a media advertisement for playing in association with the second media item;
        in response to the pre-roll advertisement not satisfying the restriction and the pre-roll media advertisement not having been played back for a minimum duration when the request for the second media item is received, replace the pre-roll media advertisement with a new pre-roll media advertisement that satisfies the restriction; and
        in response to the pre-roll advertisement satisfying the restriction, cause the client device to continue to play the pre-roll media advertisement prior to playing of the second media item; and
        cause the client device to play the second media item upon completion of the pre-roll advertisement or the new pre-roll advertisement.

2. The system of claim 1, wherein the second media item is associated with another pre-roll media advertisement and wherein the computer executable instructions further cause the processor to skip sending the other pre-roll media advertisement prior to the playing of the second media item by the client device based on receipt of the request to play the second media item prior to the completion of the pre-roll media advertisement.

3. The system of claim 1, wherein the computer executable instructions further cause the processor to cause the client device to continue to play the pre-roll media advertisement to completion prior to the playing of the second media item.

4. The system of claim 1, wherein the pre-roll media advertisement is configured for elective dismissal after playing for a minimum duration, and wherein the computer executable instructions further cause the processor to cause the client device to play the second media item in response to receipt of an election to dismiss the pre-roll media advertisement after the playing for the minimum duration.

5. The system of claim 1, wherein the computer executable instructions further cause the processor to partially rewind the pre-roll media advertisement prior to the client device continuing to play the pre-roll media advertisement prior to the playing of the second media item.

6. The system of claim 1, wherein the computer executable instructions further cause the processor to identify the restriction related to duration of a media advertisement for playing in association with the second media item.

7. The system of claim 1, wherein the new pre-roll media advertisement is selected based on at least one of duration of the new pre-roll media advertisement and duration of the pre-roll media advertisement.

8. The system of claim 1, wherein the new pre-roll media advertisement is selected based on duration of time the pre-roll media advertisement was watched prior to receipt of the request for the second media item.

9. The device of claim 1, wherein the media player is provided in a floating window that is overlaid onto other features of the graphical user interface.

10. The device of claim 1, wherein the media player is provided in a window that can be resized and moved around, minimized and maximized.

11. A device comprising:
  a memory device that stores computer executable instructions;
  at least one processor that executes the computer executable instructions stored in the memory which causes the processor to:
    receive, from a client device, an indication that a media player provided within a graphical user interface displayed by the client device is not playing a media item;
    in response to the request for the first media item, cause a media advertisement to be sent to the client device;
    cause the client device to play the media advertisement in the media player provided within the graphical user interface generated at the client device, wherein the graphical user interface is configured to facilitate navigating media content while the media advertisement plays;
    cause a plurality of selectable user interface elements each corresponding to at least one media item, including a selectable user interface element corresponding to a media item, to be displayed within the graphical user interface during playback of the media advertisement;
    receive, from the client device, a request the media item prior to completion of the media advertisement that was made via the selectable user interface element corresponding to the media item; and
    in response to the request for the first media item, cause the media item to be sent to the client device during playback of the media advertisement such that the client device buffers at least a portion of the first media item during playback of the pre-roll media advertisement;
    identify a restriction related to content of a media advertisement for playing in association with the second media item;
    in response to the media advertisement not satisfying the restriction and the media advertisement not having been played back for a minimum duration when the request for the media item is received, replace the media advertisement with a new media advertisement that satisfies the restriction;
    in response to the media advertisement satisfying the restriction, cause the client device to continue to play the media advertisement prior to playing of the media item; and
    cause the client device to play the media item upon completion of the media advertisement or the new media advertisement.

12. The device of claim 11, wherein the computer executable instructions further cause the processor to cause the client device to continue to play the media advertisement in the media player prior to playing the media item in the media player or another media player of the graphical user interface.

13. The device of claim 11, wherein the computer executable instructions further cause the processor to cause the client device to:
  generate, in response to the request for the media item, a primary media player in the graphical user interface for playing of the media item therein; and
  cause the client device to continue to play the media advertisement in the primary media player of the graphical user interface in response to the request.

14. The device of claim 11, wherein the media player is configured to remain visible as features of the graphical user interface change or move in response to the navigating.

15. A method, comprising:
  receiving, from a client device, a request for a first media item;
  in response to the request for the first media item, causing a pre-roll media advertisement associated with the first media item to be sent to the client device;
  causing the client device to play, in a media player provided within a graphical user interface displayed by the client device, the pre-roll media advertisement prior to playback of the first media item;
  in response to the request for the first media item, causing the first media item to be sent to the client device during playback of the pre-roll media advertisement such that the client device buffers at least a portion of the first media item during playback of the pre-roll media advertisement;
  causing a plurality of selectable user interface elements each corresponding to at least one media item, including a selectable user interface element corresponding to a second media item, to be displayed within the graphical user interface during playback of the pre-roll advertisement;
  receiving, from the client device, a request for the second media item prior to completion of the pre-roll media advertisement that was made via the selectable user interface element corresponding to the second media item;

in response to the request for the second media item, causing the second media item to be sent to the client device during playback of the pre-roll media advertisement such that the client device buffers at least a portion of the second media item during playback of the pre-roll media advertisement;

identifying a restriction related to content of a media advertisement for playing in association with the second media item;

in response to the pre-roll advertisement not satisfying the restriction and the pre-roll media advertisement not having been played back for a minimum duration when the request for the second media item is received, replacing the pre-roll media advertisement with a new pre-roll media advertisement that satisfies the restriction; and in response to the pre-roll advertisement satisfying the restriction, causing the client device to continue to play the pre-roll media advertisement prior to playing of the second media item; and causing the client device to play the second media item upon completion of the pre-roll advertisement or the new pre-roll advertisement.

16. The method of claim 15, wherein the second media item is associated with another pre-roll media advertisement and wherein the method further comprises skipping the sending of the other pre-roll media advertisement prior to the playing of the second media item by the client device based on receipt of the request to play the second media item prior to the completion of the pre-roll media advertisement.

17. The method of claim 15, further comprising causing the client device to continue to play the pre-roll media advertisement to completion prior to the playing of the second media item.

18. The method of claim 15, wherein the pre-roll media advertisement is configured for elective dismissal after playing for a minimum duration, and wherein the method further comprises causing the client device to play the second media item in response to receipt of an election to dismiss the pre-roll media advertisement after the playing for the minimum duration.

19. The method of claim 15, further comprising partially rewinding the pre-roll media advertisement prior to the client device continuing to play the pre-roll media advertisement prior to the playing of the second media item.

20. The method of claim 15, further comprising identifying the restriction related to duration of a media advertisement for playing in association with the second media item.

* * * * *